United States Patent
Walker et al.

(10) Patent No.: US 7,715,530 B2
(45) Date of Patent: May 11, 2010

(54) POTS BATTERY REMOVAL FOR IP/ATM-BASED NETWORK EQUIPMENT

(75) Inventors: Bryan David Walker, Round Rock, TX (US); Mark Lamar Dement, Round Rock, TX (US); Eugene L. Edmon, Danville, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1059 days.

(21) Appl. No.: 11/114,363

(22) Filed: Apr. 25, 2005

(65) Prior Publication Data

US 2006/0239417 A1 Oct. 26, 2006

(51) Int. Cl.
*H04M 11/04* (2006.01)
(52) U.S. Cl. .......................................... 379/37; 398/58
(58) Field of Classification Search ................. 370/352, 370/353, 390, 392, 463, 480, 338; 340/635; 379/413, 15.01, 37, 33; 709/228–249; 398/66–77, 398/171
See application file for complete search history.

(56) References Cited

U.S. PATENT DOCUMENTS

| | | | |
|---|---|---|---|
| 4,647,787 A * | 3/1987 | Pommer, II | .................. 379/413 |
| 5,278,888 A | 1/1994 | Myllymaki | |
| 5,867,481 A | 2/1999 | Miyagi | |
| 5,909,480 A * | 6/1999 | Reynaud et al. | .......... 379/15.01 |
| 6,393,105 B1 * | 5/2002 | Beveridge | .................... 379/413 |
| 6,529,500 B1 * | 3/2003 | Pandharipande | ............ 370/352 |
| 7,274,684 B2 * | 9/2007 | Young et al. | ................. 370/352 |
| 7,277,637 B2 * | 10/2007 | Jette et al. | ...................... 398/70 |
| 7,340,171 B2 * | 3/2008 | Song et al. | ................... 370/352 |
| 2003/0048768 A1 * | 3/2003 | Nakamura et al. | .......... 370/338 |
| 2005/0190743 A1 * | 9/2005 | Marcu et al. | ................. 370/352 |
| 2005/0198399 A1 * | 9/2005 | Stancil | ........................ 709/249 |
| 2006/0187071 A1 * | 8/2006 | Kortum et al. | ............... 340/635 |

* cited by examiner

*Primary Examiner*—Curtis Kuntz
*Assistant Examiner*—Maria El-Zoobi
(74) *Attorney, Agent, or Firm*—Jackson Walker L.L.P.

(57) ABSTRACT

The present invention discusses a method and apparatus for selectively providing a power to an alarm system, such as the power source provided by a telephone company, to alarm equipment located at customer's premises in a Fiber to the Premises (FTTP) telephone network. This power source is commonly used to power the POTS lines in a Service Provider's network. Two signals, one relating to the optical connectivity of the network and one relating to the connectivity of virtual circuits, are monitored at the customer premises. A logical operation is performed so as to remove a power source if either of the two signals is lost.

7 Claims, 7 Drawing Sheets

POTS BATTERY REMOVAL FOR IP/ATM-BASED NETWORK EQUIPMENT

BACKGROUND OF THE INVENTION

1. Field of the Invention

The present invention relates in general to the field of security systems in a telecommunications network. In particular, the present invention relates to a method and apparatus for power management in an auxiliary alarm system linked to in a Fiber to the Premises (FTTP) network.

2. Description of the Related Art

Security systems operate by delivering a signal from a home or business to local officials (i.e. local police, security agency, medical unit, etc.) in the event of an emergency. The signal is delivered over an established channel, typically over the phone connection. The power to operate some of these security systems is drawn from conventional (110/120 V AC typical) commercial power sources. The voltage potential on the Service Provider's POTS (Plain Old Telephone Service) is simply for powering the voice circuity/communication path from the security system to the telephone company network. Thus, a security system is fully functional whenever the phone connection is intact but leaves the premises vulnerable when the phone connection is lost. In anticipation of this situation, current security systems are designed to detect the occurrence of a lost phone connection by reacting the loss of power on the POTS line. If power is lost or a phone connection is cut, the security system typically alerts the resident through a pre-programmed mechanism, such as emitting an audio signal or flashing a light-emitting diode.

In traditional phone networks, an electrical signal travels from a central office over copper wires connecting to phone termination points, such as a network interface device (NID) at a home or business. New advances in telephony now provide the ability to transmit telephone signals using light signals sent over fiber optic cable rather than as electrical signals sent over copper cable. Although fiber optic cable is commonly used for transmission over large distances, optical signals are generally converted to electrical signals before arriving at the termination point. At present, there is a movement in the industry to provide Fiber to the Premises (FTTP) connections, i.e. an optical connection all the way to the NID. In addition to FTTP, there is a novel field of telephone communications, exemplified by Voice over Internet Protocol (Voice over IP, or VoIP) and Voice over Asynchronous Transfer Mode (Voice over ATM, or VoATM) which transfers signals using different methods than traditional phone connections. The new access architectures that utilize VoATM/FTTP and VoIP alters how voice service has traditionally been delivered in order to maintain a transparent migration to newer technologies.

In the newer forms of communications, it is possible for a customer premise to lose a telephone connection and still have line power (−48 volts DC) power present on the POTS line. This leaves the premise vulnerable to a breach of security without an alarm. If the phone is disconnected yet the (−48 volts DC) power is still present, the security system does not react to the condition of loss of connection. Although it is not possible to send a signal or call out to alert local officials, the security system is unaware of the vulnerability of the premises. Therefore, there is a need to notify a security system of the loss of a phone connection in newer generation telephone architecture, such as exemplified by FTTP.

SUMMARY OF THE INVENTION

The present invention provides a method and apparatus for sensing loss of a communication link signal and, based on the signal interrupting or providing power to customer premises equipment such as an auxiliary alarm system at the customer premises in a Fiber to the Premises (FTTP) telephone network. Generally, the power source is provided by a local telephone company over a telephone communication link. This power, about −48V DC, is commonly used to power the communication links, thereby enabling security systems to communicate with local officials in case of burglary, fire, medical emergency, etc. The FTTP network comprises an optical connection providing digital signals, such as voice or data, to the premises over one or more virtual circuits. In an embodiment of the present invention, a signal relating to the optical connectivity of the network is monitored at the customer premises. Also, a signal relating to the connectivity of the virtual circuits is monitored at the customer premises. The optical connectivity signal can be monitored at an optical network terminal, generally at a transceiver device responsible for optical to electrical signal conversion. The virtual circuitry can be monitored. A logical operation (an OR gate) is performed on the two obtained signals. If at least one of these signals is lost, the power source to the auxiliary alarm is removed or reduced, causing the security system to sense power loss and take appropriate action.

In one aspect of the invention a method is provided for selectively providing power to customer premises equipment (CPE), comprising obtaining at least one signal related to connectivity of a communication link and selectively providing power the CPE based on the at least one obtained signal. In another aspect of the invention the communication link comprises a Fiber to the Premises (FTTP) link. In another aspect of the invention the communication link comprises a voice over internet protocol (VoIP) link. In another aspect of a signal from a virtual circuit of the network and a signal related to optical connectivity of the network or communication link are obtained. The connectivity of a virtual circuit comprises an Asynchronous Transfer Mode (ATM) signal at customer premises. In another aspect of the invention at least one signal related to optical connectivity is obtained such as a signal from a device that converts between optical signals received from a network and electronic signals usable in a CPE. In another aspect of the invention a logical operation is performed on the obtained signals to determine whether to provide power. In another aspect of the invention the providing power further comprises reducing power from a power source upon the loss of one or more of the at least one obtained signals. In another aspect of the invention the power is provided to an alarm system. In another aspect of the invention the alarm system notifies an outside emergency unit. In another aspect of the invention, an apparatus is provided for selectively providing power to customer premises equipment (CPE), comprising an or gate that receives at least one signal related to connectivity of a communication link; and a processor that selectively provides power the CPE based on the at least one obtained signal.

BRIEF DESCRIPTION OF THE DRAWINGS

For a detailed understanding of the present invention, references should be made to the following detailed description of an exemplary embodiment, taken in conjunction with the accompanying drawings, in which like elements have been given like numerals.

FIG. 4 displays monitoring points at the optical network termination points of

DETAILED DESCRIPTION OF THE INVENTION

In view of the above, the present invention through one or more of its various aspects and/or embodiments is presented to provide one or more advantages, such as those noted below.

Figure 1:
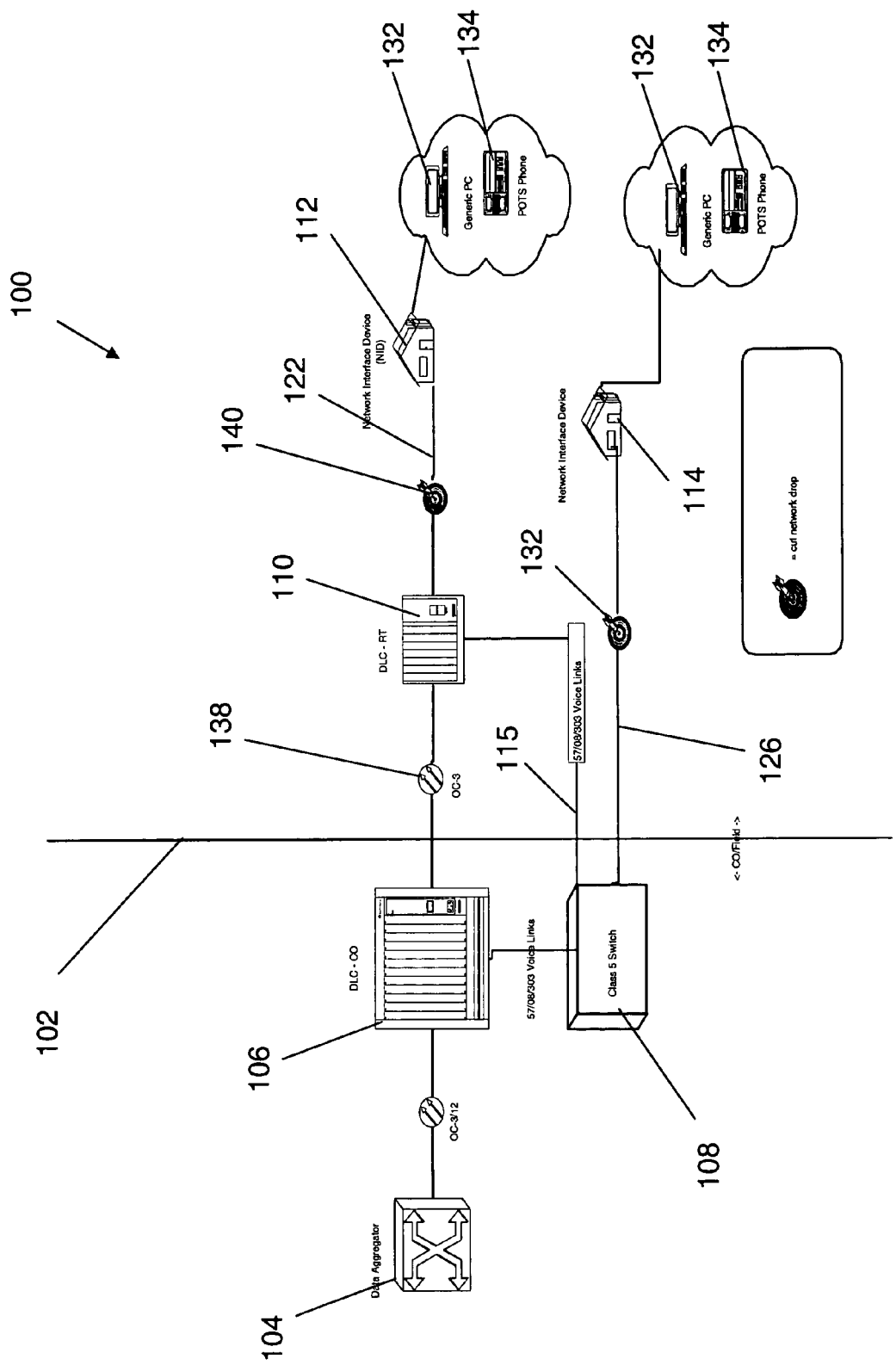
FIG. 1 illustrates an example of a traditional network architecture for providing a POTS connection and a data connection from a central office to a residence.

FIG. 1 illustrates an exemplary architecture 100 of a traditional telephone connection network. One set of equipment is operated at a central office, and another set of equipment is operated in the field. A separation between office equipment and field equipment is indicated by line 102. At the Central Office (CO), a Digital Loop Carrier (DLC) 106 is coupled to a Data Aggregator 104 and to a Class 5 Switch 108. The Data Aggregator 104 concentrates the data feeds from the DLC-CO 106 over a high-speed digital fiber link. The Class 5 Switch 108 provides multiple telephone connections over many wires, one of which is shown. This wire loop 126 connects the Class 5 Switch to a Network Interface Device (NID) 114 located at the customer's premises. Traditionally, an analog signal is sent along the connection. The NID 114 provides electrical protection and primarily serves to separate the Service Provider's facilities from the customer's facilities, wherein lies several types of customer premises equipment (CPE), such as computer 132 and telephone 134.

Long loops, such as those terminating at more than 18,000 feet from the central office generally pose electrical challenges. Digital Loop Carrier (DLC) systems are used to reduce copper cable pair requirements and to overcome electrical constraints on long loops. The DLC comprises a central office equipment (DLC-CO, 106) and remote equipment (DLC-RT, 110). In the example of FIG. 1, an optical OC-3 carrier cable 138 connects the DLC-CO 106 to the DLC-RT 110.

The link between DLC-CO 106 and DLC-RT 110 generally carries data and voice signals. Data and voice signals arriving at the DLC-CO from the field are separated from each other. The voice signals travel to the Class 5 Switch 108 and the data signals travel to the Data Aggregator 104. In the other direction, data signals from the Data Aggregator 104 and voice signals from the Class 5 Switch 108 are combined at the DLC-CO and sent to the DLC-RT. Alternatively, a trunk 115 (a circuit that connects two switching systems) connects the Class 5 Switch 108 to the DLC-RT 110 to provide voice. The DLC-RT provides service to multiple NIDs one of which (NID, 112) is displayed in FIG. 1. A typical DLC-RT provides for 96 connections. At the customer premises, the NID 112 interfaces with various devices, such as computer 132 or POTS phone 134.

In addition to providing voice and data signals to a residence, connections 122 and 126 provide power (typically 48V DC). If a cut 140 on loop 122 is introduced on the network side of the NID 112, for instance, power is automatically lost to the NID 112. A cut 132 on loop (or drop) 126 also produces a loss of power. A security system (e.g., burglar alarm, fire alarm, health monitoring system) at the residence requiring the power supplied by the phone company for POTS service senses this loss of power. Typically, a visual signal, such as an LED, is activated to alert people that the premises has lost a communication link and that the backup communication system (i.e. cellular link) has been activated.

Figure 2:
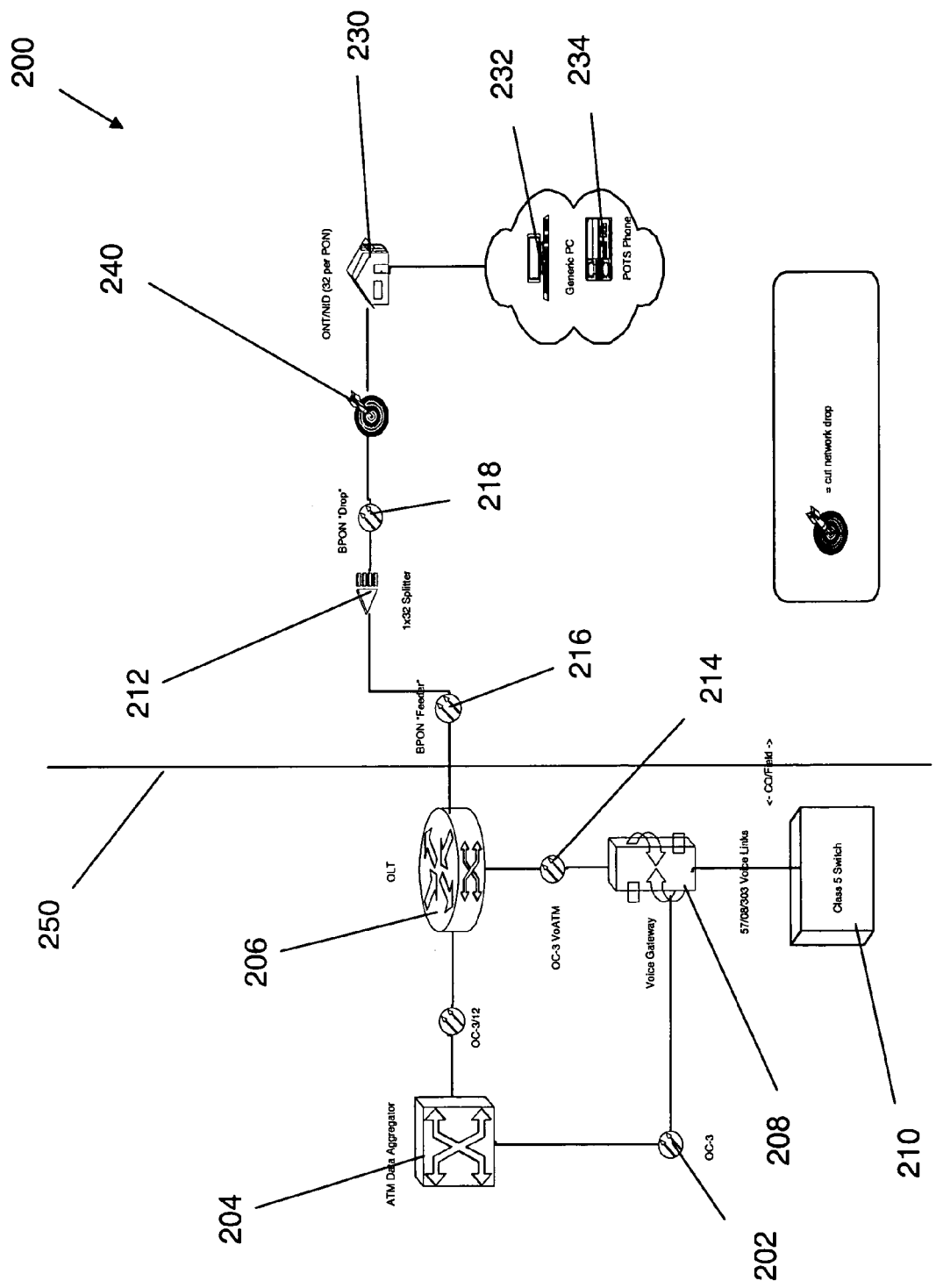
FIG. 2 illustrates an example of a network architecture for providing a POTS connection and a data connection using Fiber to the Premises technology.

FIG. 2 illustrates network architecture 200 providing a telephone connection using Fiber to the Premises (FTTP). A set of equipment is operated at a central office, and another set of equipment is operated in the field. A separation between office equipment and field equipment is indicated by line 250. At the central office, an Optical Line Terminal (OLT) 206 is coupled to a line connection to outside phone connections. An OLT typically comprises 36 ports, with each port serving 32ONT units. Each port 216 optically connects to a splitter, such as the 1×32 splitter 212, which separates the 32 signals traveling along feed 216 to 32 optical feeds 218 leading to the appropriate customer premises. An ONT (Optical Network Terminal) 230 located at the customer premises provides an interface between network elements and equipment such as computer devices 232 and phone devices 234 located at the premises. An exemplary OLT suitable for the purposes of this invention is made by Alcatel.

At the central office, the OLT 206 receives data and voice signals from the ONT and separates the incoming data. Data signals are sent to the Data Aggregator 204, and voice signals are sent to the Voice Gateway 208 via optical cable 214. Also, the OLT combines incoming data from the Aggregator with incoming voice from the Voice Gateway to be sent to the field. The Data Aggregator concentrates the signals from the OLT over a high-speed digital fiber link. The Voice Gateway converts between VoATM signals (and VoIP signals) from the OLT into traditional voice signals which are sent to the Class 5 Switch 210. A suitable Voice Gateway for use in the present invention is made by General Bandwidth. An optical link 202 provides an alternate pathway for getting voice from the OLT 206 to the Voice Gateway 204.

Each termination point, such as ONT 230, communicates with the central office using one or more virtual circuits. For example, an ONT might utilize one virtual circuit for data signal transfer and one virtual circuit for voice signal transfer. The virtual circuit for data runs from the Data Aggregator 204 through the OLT 206 to the ONT 230. The virtual circuit for voice runs from Voice Gateway 208 through the OLT 206 to the ONT 230. The ONT and the OLT regularly communicate with each other to provide the identification necessary to direct signals to the correct location. Data transferred between the OLT and the ONT are typically encoded using standard protocols well known in the industry, such as Voice over IP (VoIP) or Voice over ATM (VoATM) and are transferred through the network using Passive Optical Network (PON) protocol.

Referring to FIG. 2, if a cut 240 occurs anywhere on the network side of the ONT unit 230 (which is typically mounted on the outside of a house or residence), the digital signal will be lost, but the ONT continues to produce −48V DC. Since a security system that is connected to the phone link would still be sensed by the 48V DC in the event of a dropped phone connection, the security system would be unaware of the vulnerable condition. In traditional phone networks, the power is lost simultaneously with the loss of phone connection, causing the security system to "become aware" of the vulnerable situation. This is not the case in current FTTP network architecture, as shown in FIG. 2.

Figure 3:
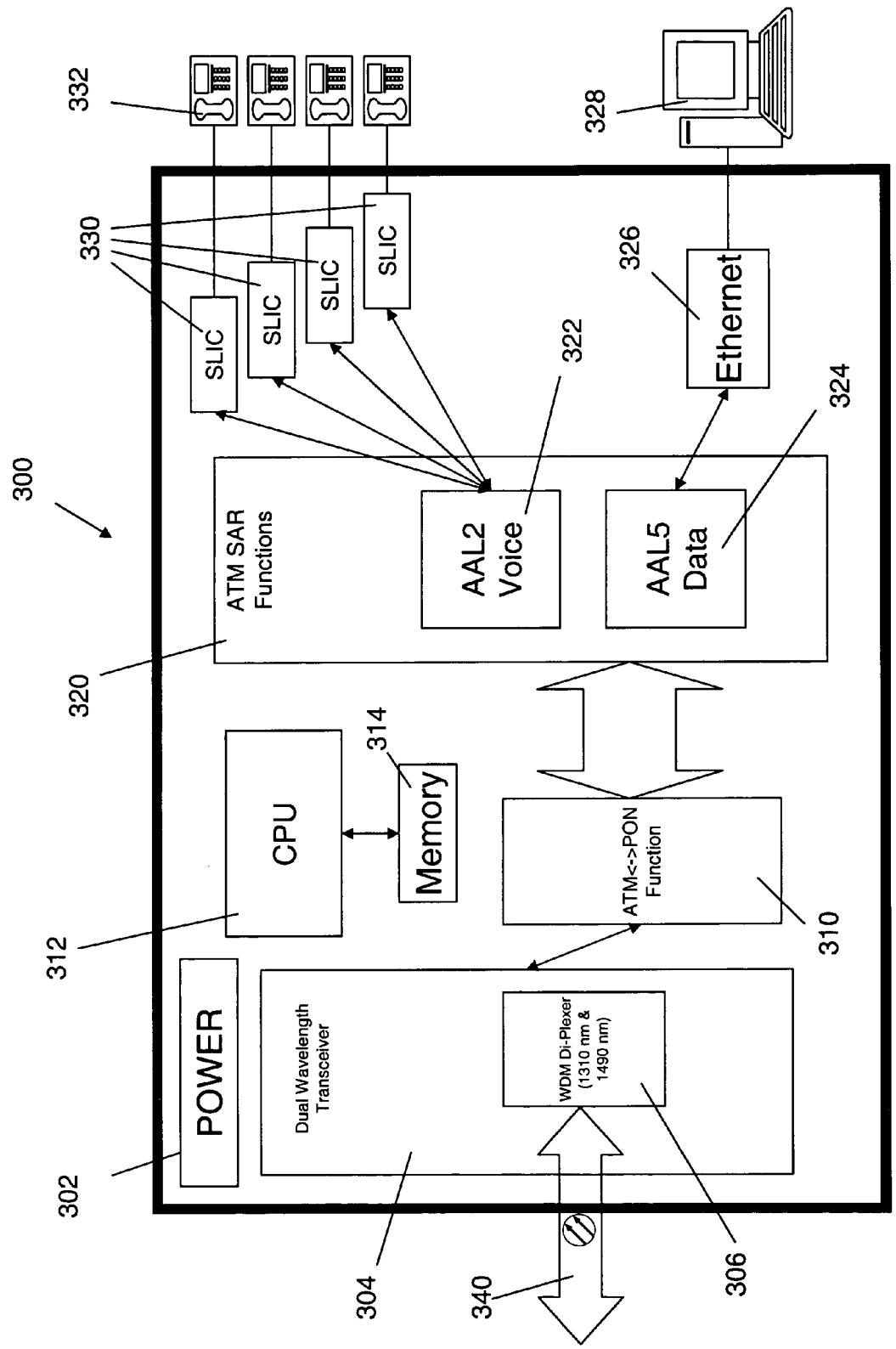
FIG. 3 illustrates a block diagram of an exemplary optical network termination point.

FIG. 3 illustrates an exemplary architectural diagram detailing a typical Optical Network Terminal device 300. A power source 302 is shown as well as a CPU 312 and memory 314 which enable operation of the ONT. Optical signals travel via optical connection 340 to and from the phone company's central office. An incoming signal to the ONT enters a Dual Wavelength Transceiver 304 comprising a WDM (Wave Division Multiplexer) Di-Plexer 306 for separating two wavelengths of light into different channels. A practitioner in the art would recognize that a multiplexer having more than two channels could also be used in place of the Di-Plexer. A typical Di-Plexer operates on light having wavelengths of 1310 nm and 1490 nm, which are standard transmission wavelengths used in the industry. The Transceiver 304 separates and converts these incoming optical signals into electrical signals. Electrical signals are transferred between the Transceiver 306 and the ATM/PON Function Module 310. The ATM/PON Function Module 310 is responsible for the unique transmission control protocol of the system. Additionaly, the ATM/PON Function Module extracts Asynchronous Transfer Mode (ATM) cells from the incoming signals. The ATM cells are transferred to the Segmentation and Reassembly Layer (SAR) 320. The SAR comprises several ATM Adaptation Layers, such as ATM Adaptation Layer 2 (AAL2, 322) and ATM Adaptation Layer 5 (AAL5, 324), which adapt the ATM signals to the various services. Voice signals are transferred to AAL2 322 and data signals are transferred to AAL5 324. Data signals travel by an Ethernet connection 326 from AAL5 324 to an appropriate device, such as a computer 328. Voice signals travel from AAL2 322 to an appropriate Subscriber Line Interface Circuit (SLIC) 330 en route to telephone 332.

Figure 4:
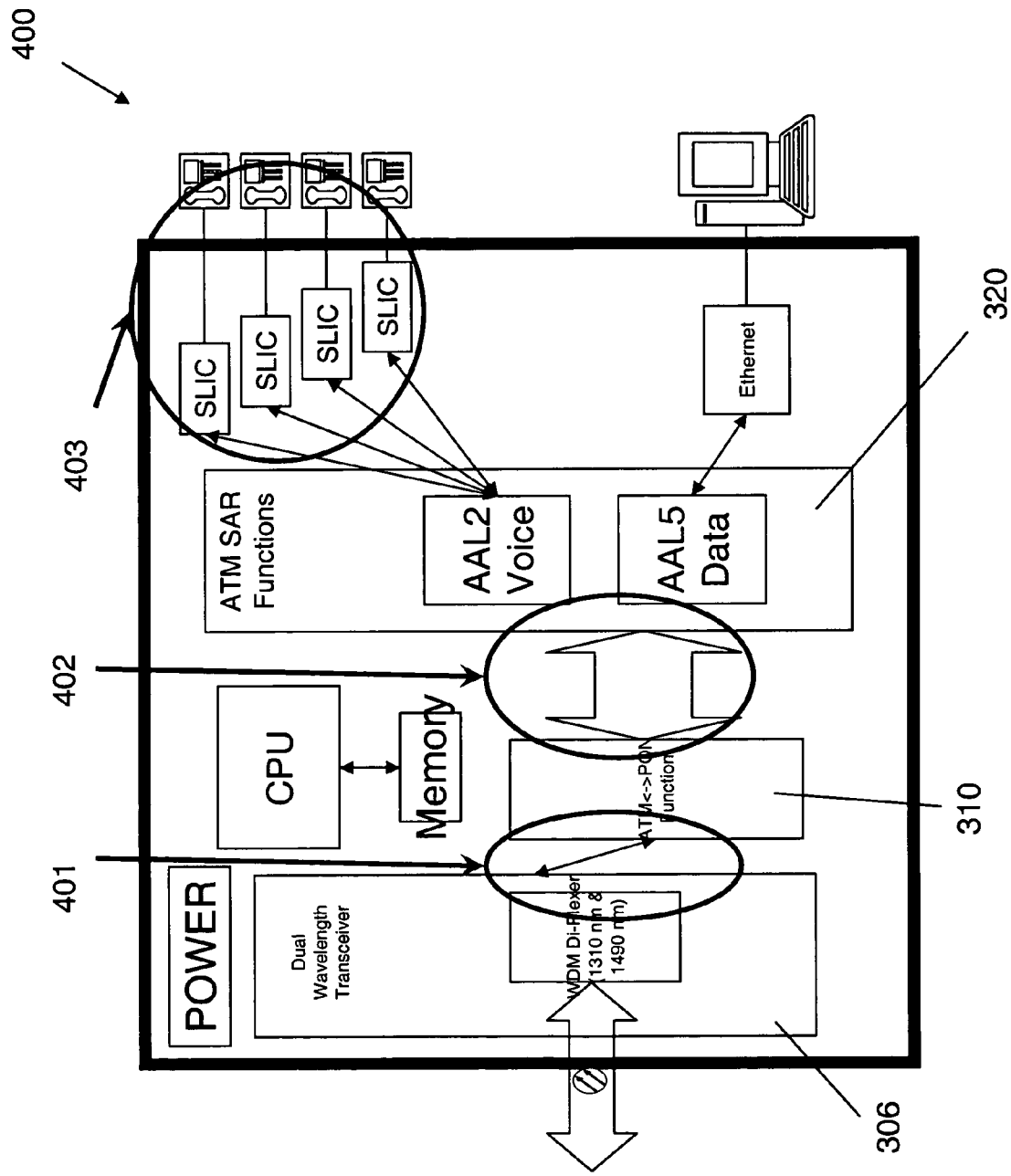

FIG. 4 illustrates the ONT block diagram 400 of FIG. 3. Three points are indicated for providing the method and apparatus of the present invention. A first monitoring point can be established at the link 401 between the Transceiver 306 and the ATM-PON function 310. This monitoring point reveals information on the state of the optical connection to the network. A second monitoring point can be established at link 402 between the ATM/PON Function Module 310 and the SAR 320. This monitoring point reveals information on the connectivity of the virtual circuits of the FTTP connection. If either or both monitoring points (401, 402) indicates a loss of signal, power is terminated at the SLIC 403.

Figure 5:
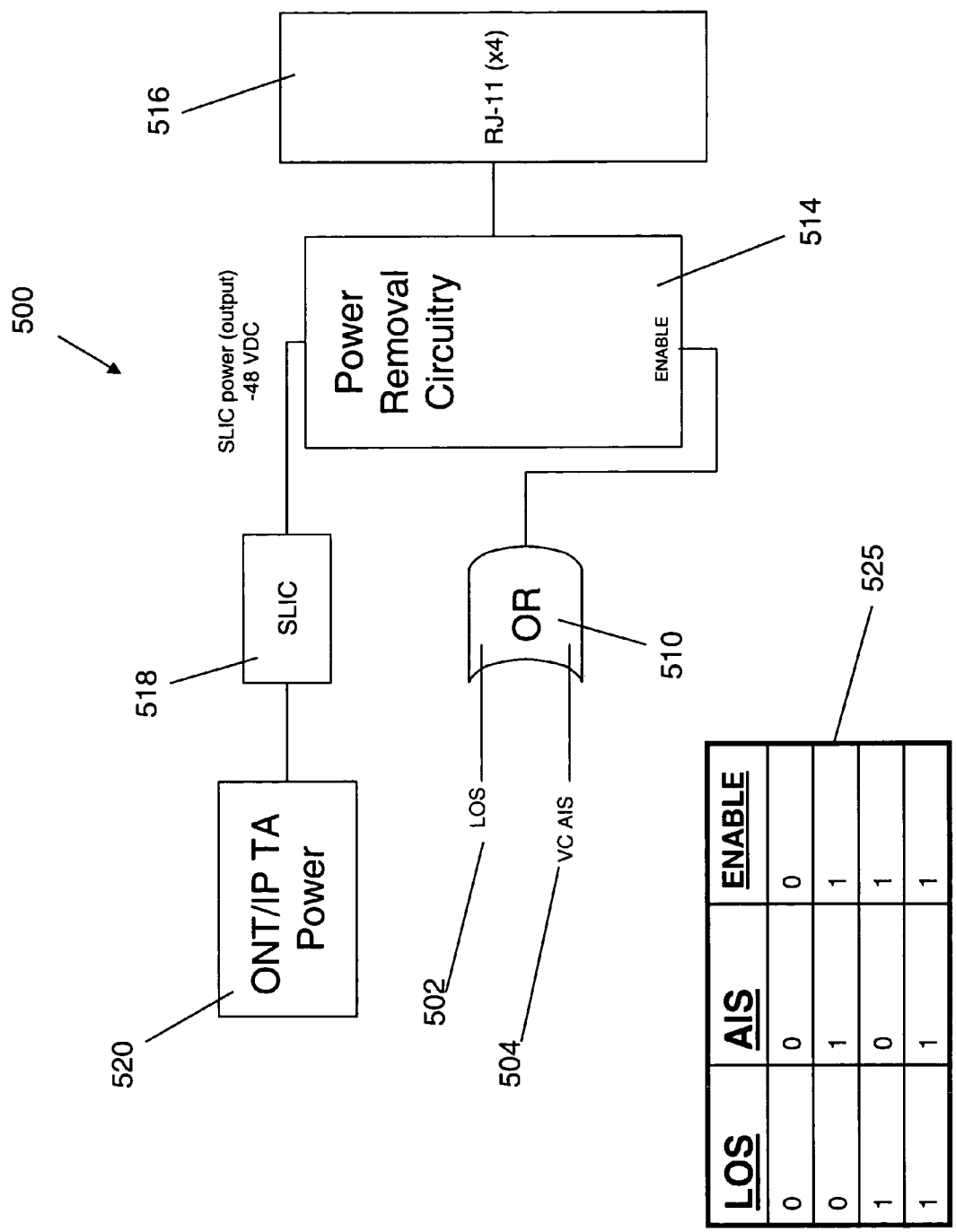
FIG. 5 displays a logical connection for providing power management to the POTS portion of an Optical Network Termination (ONT)

FIG. 5 shows a logical diagram enabling this power reduction. A logical gate 510 is shown with two inputs: loss of signal (LOS) 502 receiving input from point 401 of FIG. 4, and VC AIS 504 (virtual circuit alarm indication signal) receiving input from point 402 of FIG. 4. In an exemplary embodiment of the present invention, the logical gate is an OR gate. The output of the logical gate 510 is input to the Power Removal Circuitry 514. If an optical signal is present, the LOS signal is '0', and if the virtual circuit stream is present, the VC AIS is '0'. Thus if both the LOS='0' and the VC AIS is '0', the telephone connection is operable and, in accordance with the present invention, the Power Removal Circuitry 514 is disabled. Thus power is supplied to SLIC 518. This can be seen by observing the top row of the logical OR table 525, in which the output signal (ENABLE)='0'. Still referring to the logical table, if either the optical signal is no longer present or if the virtual circuit stream is no longer present, or both, the Power Removal Circuitry is activated (ENABLE='1') and power source 520 is shunted at the SLIC 518, and RJ-11 outlet 516 loses its power. Any security system connected through RJ-11 516 then proceeds to notify the resident and/or utilize a "fallback" system such as a cellular link.

While the FTTP/VoATM implementation is utilized here as an example, the concept is the same for VoIP deployments that utilize a Terminal Adapter (TA) for traditional POTS phone use. The following parallels can be drawn and used interchangeably in the attached diagrams and explanations:

| VoATM/FTTP | VoIP |
| --- | --- |
| ONT = | Terminal Adapter |
| Optical Signal = | Ethernet Connection |
| ATM VC to Voice Gateway = | IP Connectivity to Residential Gateway |
| Optical Drop Cable = | Ethernet Medium (Cat5, Wireless, etc.) |

However, with FTTP, the entire access network is optical all the way to the premises.

Figure 6:
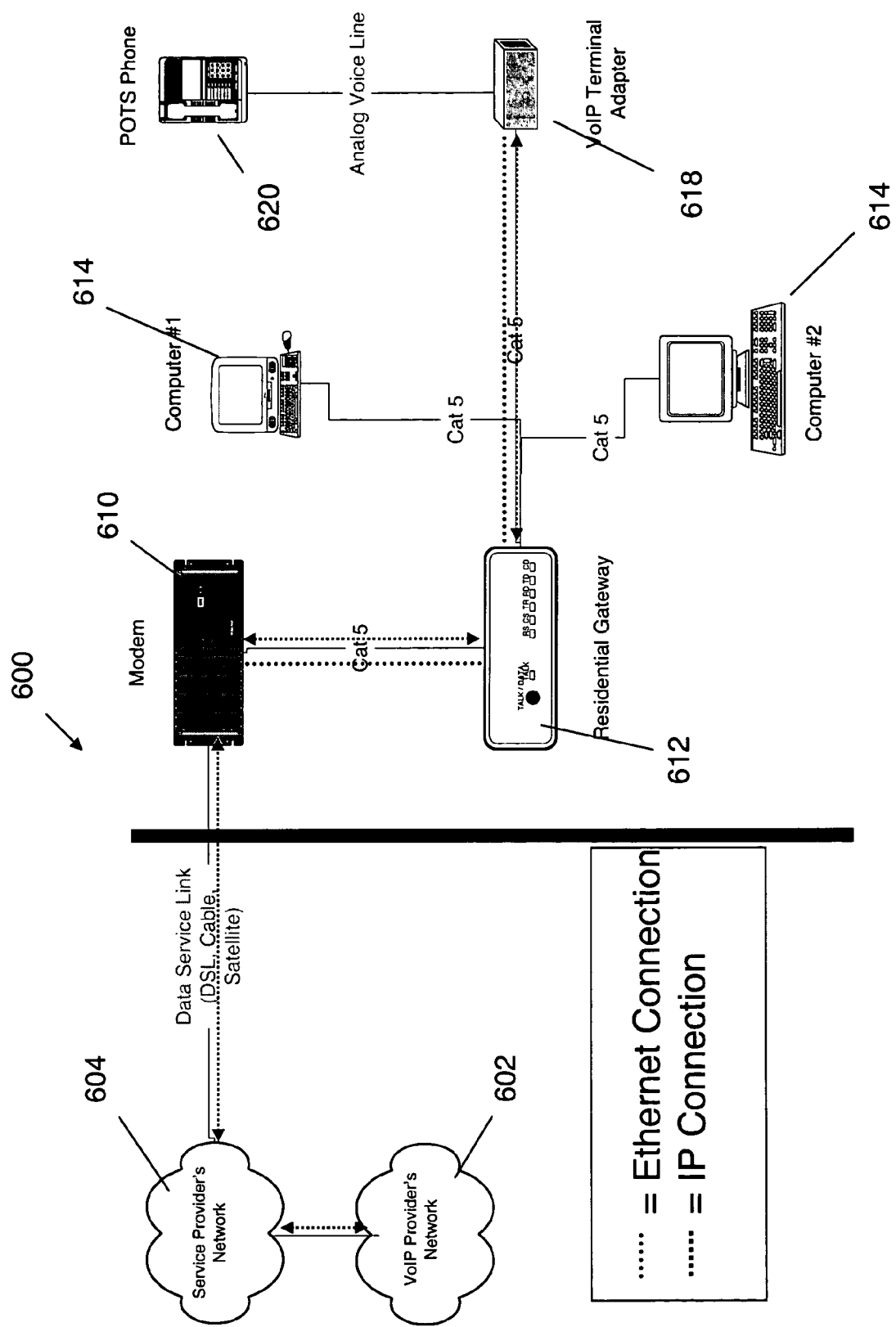
FIG. 6 illustrates network architecture providing a telephone connection using Voice over IP (VoIP)

FIG. 6 illustrates network architecture 600 providing a telephone connection using Voice over IP (VoIP) with a data connection. Voice data from the VoIP Provider's Network 602 is provided to the Service Provider's Network 604 over an IP connection. The Service Provider's Network 604 transfers and receives data to and from modem 610 located at the customer premises. Data transfer between Service Provider's Network and modem can occur over a connection such as DSL (Digital Subscriber Line), cable, satellite, etc. At the customer premises, the modem communicates with a Residential Gateway 612. Typically, an IP over Ethernet connection is established over Cat5 wire for this connection. Signals are exchanged between the Residential Gateway, computer, and VoIP Terminal Adapter 618. The Terminal Adapter 618 in turn exchanges electrical signals with the POTS phone 620 over an analog voice line.

Figure 7:
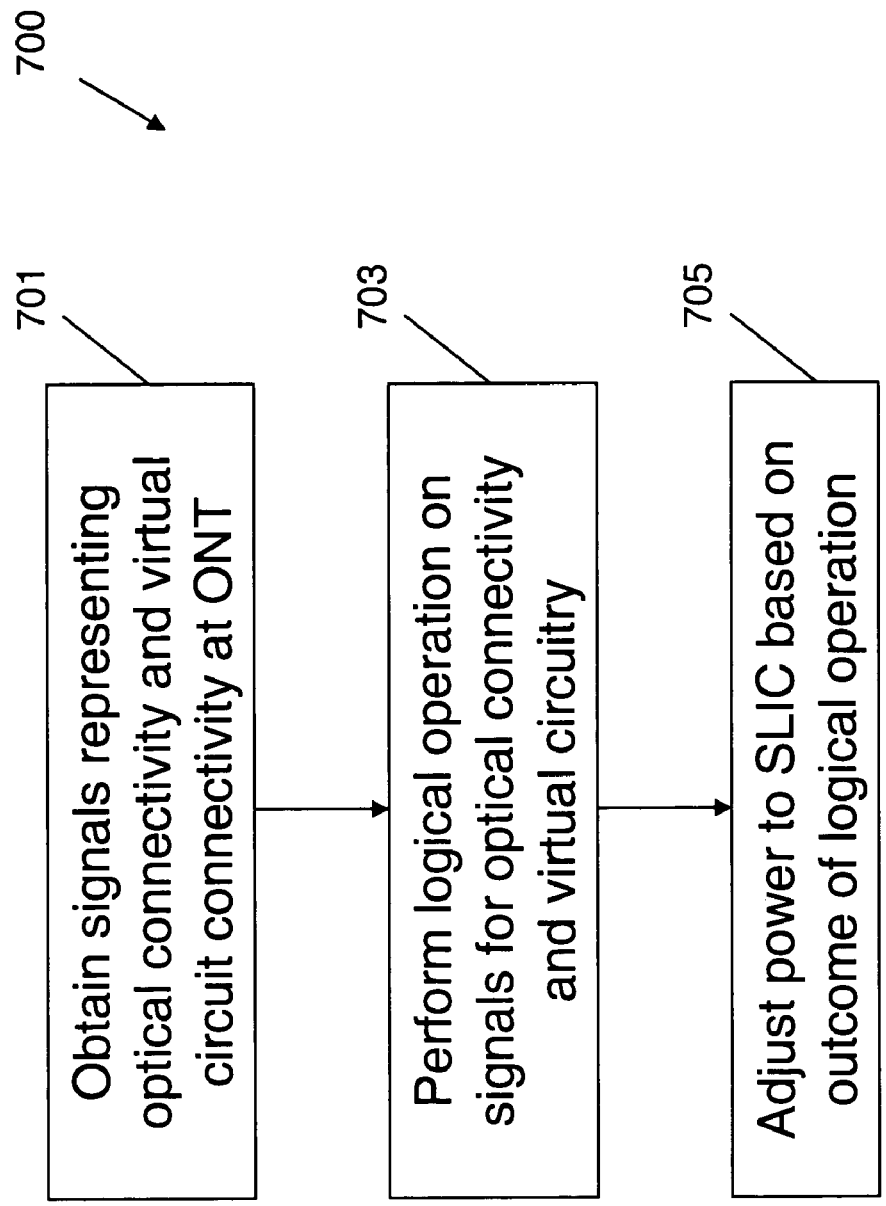
FIG. 7 shows a flowchart of one aspect of the present invention.

FIG. 7 shows a flowchart 700 of one aspect of the present invention. In Box 701, signals are obtained. These signals represent the connectivity of the optical channel at the ONT, and the connectivity of the virtual circuits at the ONT. These signals can be represent in binary format, where, for example '0' represents a connected circuit and '1' represents a disconnected circuit. In Box 703, a logical operation is performed on the two signals. In an exemplary embodiment, a binary 'OR' operation is performed. In Box 705, the output of the logical operation on the two signals enables a power removal circuitry 514 to adjust the power to SLIC 518.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. An apparatus for selectively providing power to an alarm system, comprising:
   a first circuit configured to:
      receive a first signal indicative of a state of an optical connection to an optical network termination;
      receive a second signal indicative of a state of a virtual circuits of a Fiber to the Premises (FTTP) communication link; and
      produce an output based on the first and second signals;
   a power removal circuit configured to:
      receive the output of the first circuit at an enabling input;
      receive a power signal;
      pass the received power signal to a power removal circuit output when the output of the first circuit does not enable the power removal circuit.

2. The apparatus of claim 1, wherein the first signal is indicative of a state of an electrical signal produced by a wave division multiplexer.

3. The apparatus of claim 2, wherein the second signal is indicative of a state of asynchronous transfer mode (ATM) cells extracted from the electrical signal.

4. The apparatus of claim 3, wherein the electrical signal carries passive optical network protocol compliant information.

5. The apparatus of claim 1 wherein the first circuit is a logical or circuit wherein an output of the first circuit enables the power removal circuit if either the first signal or the second signal indicates a loss of connectivity.

6. The apparatus of claim 1, wherein the power removal circuit is configured to control power to a subscriber line interface card.

7. A method for selectively providing power to an alarm system, comprising:
   receiving a first signal indicative of a state of an optical connection to an optical network termination;
   receiving a second signal indicative of a state of a virtual circuits of a Fiber to the Premises (FTTP) communication link;
   producing a control output based on the first and second signals;
   receiving the control output at an enabling input;
   receiving a power signal;
   passing the received power signal to a power output when the control output is not asserted.

* * * * *